US012666194B2

(12) United States Patent
Liang et al.

(10) Patent No.: US 12,666,194 B2
(45) Date of Patent: Jun. 23, 2026

(54) WEARABLE DEVICE AND SIGNAL PROCESSING METHOD

(71) Applicant: xMEMS Labs, Inc., Santa Clara, CA (US)

(72) Inventors: Jemm Yue Liang, Sunnyvale, CA (US); Hsi-Sheng Chen, Fremont, CA (US); Eldwin Jiaqiang Ng, Sunnyvale, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 19/206,074

(22) Filed: May 13, 2025

(65) Prior Publication Data

US 2025/0358562 A1 Nov. 20, 2025

Related U.S. Application Data

(60) Provisional application No. 63/679,104, filed on Aug. 3, 2024, provisional application No. 63/672,255, filed on Jul. 17, 2024, provisional application No. 63/650,424, filed on May 22, 2024, provisional application No. 63/649,366, filed on May 18, 2024.

(51) Int. Cl.

*H04R 1/10* (2026.01)
*H04R 3/00* (2006.01)

(52) U.S. Cl.

CPC ......... *H04R 1/1083* (2013.01); *H04R 1/1008* (2013.01); *H04R 3/005* (2013.01)

(58) Field of Classification Search

CPC ..... H04R 1/1083; H04R 1/1008; H04R 3/005
USPC ........................................................ 381/71.1
See application file for complete search history.

(56) References Cited

U.S. PATENT DOCUMENTS

| | | | | |
|---|---|---|---|---|
| 6,920,227 | B2 | 7/2005 | Chalupper | |
| 12,192,695 | B1 * | 1/2025 | Stockton X | H04R 1/1008 |
| 2013/0243225 | A1 * | 9/2013 | Yokota | G10K 11/17885 381/300 |
| 2017/0246481 | A1 * | 8/2017 | Mishelevich | A61N 2/008 |
| 2017/0251297 | A1 * | 8/2017 | Darlington | G10K 11/17885 |
| 2020/0112783 | A1 * | 4/2020 | Wakeland | H04R 1/347 |
| 2022/0284878 | A1 | 9/2022 | Kuenzle | |
| 2022/0392479 | A1 * | 12/2022 | Kim | H04R 1/028 |
| 2023/0024984 | A1 * | 1/2023 | Zhang | G10L 21/034 |
| 2024/0163612 | A1 | 5/2024 | Roach | |
| 2024/0312447 | A1 * | 9/2024 | Yu | G10K 11/17885 |
| 2025/0203309 | A1 * | 6/2025 | Fukui | H04R 1/02 |

FOREIGN PATENT DOCUMENTS

| | | | |
|---|---|---|---|
| TW | 202322637 | A | 6/2023 |
| TW | 202341747 | A | 10/2023 |

* cited by examiner

*Primary Examiner* — Carolyn R Edwards
*Assistant Examiner* — Friedrich Fahnert
(74) *Attorney, Agent, or Firm* — Winston Hsu

(57) ABSTRACT

The wearable device includes a sound producing device and a sound sensing device. The sound producing device produces a front radiating wave and a back radiating wave while producing the sound. The sound sensing device is disposed on a nodal position where the front radiating wave and the back radiating wave cancel each other on the nodal position.

25 Claims, 14 Drawing Sheets

11(a)

11(b)

11(c)

12(a)

12(b)

WEARABLE DEVICE AND SIGNAL PROCESSING METHOD

CROSS REFERENCE TO RELATED APPLICATIONS

This application claims the benefit of U.S. Provisional Application No. 63/649,366, filed on May 18, 2024. Further, this application claims the benefit of U.S. Provisional Application No. 63/650,424, filed on May 22, 2024. Further, this application claims the benefit of U.S. Provisional Application No. 63/672,255, filed on Jul. 17, 2024. Further, this application claims the benefit of U.S. Provisional Application No. 63/679,104, filed on Aug. 3, 2024. The contents of these applications are incorporated herein by reference.

BACKGROUND OF THE INVENTION

1. Field of the Invention

The present application relates to a wearable device and a signal processing method, and more particularly, to a wearable device and a signal processing method capable of establishing an SPD-to-ASM isolation.

2. Description of the Prior Art

In recent years a new style of true wireless earbud has emerged.

In prior generation true-wireless (herein referred to as TWS (known as true wireless stereo) for brevity) earbuds, it's a common practice to insert silicone-/foam-covered tips of sound tubes into listeners' ear-canals to create semi-/fully occluded spaces between the sound producing drivers/devices (SPD) of the TWS earbuds and the listeners' eardrums.

Two effects are achieved by such practice: 1) bass performance improvement; and 2) ambient to ear-canal isolation.

Contrary to the TWS practice, these new "open wear style" true wireless (herein referred to as OWS (known as open wearable stereo) for brevity) earbuds are characterized by leaving the orifices of the ear canals unblocked, allowing air to move freely into/out of the ear canal. Such OWS earbuds are usually praised for being more comfortable, more natural sounding, allowing their users to be more ambient aware, and since air can flow naturally into and out of ear, and being far less fatiguing than prior generation TWS earbuds, thus can be worn over extended periods of time without their users experiencing physical discomfort or subliminal/mental imbalance induced by acoustic isolation.

One of the major technological advances in non-open-wear/occluded TWS earbuds is the concept of Active Noise Cancelling (ANC) and intelligent ambient passthrough, or generally ambient control (AC).

In occluded TWS earbuds, the earbud housing and the (foam or silicone covered) tip partitions the space around listener's ear into three subdivisions: 1) the front chamber of the sound producing driver/device (SPD) plus the listener's ear canal; 2) the back chamber of SPD which contains subcomponents of SPD, electronics, battery, etc., inside the earbud housing; and 3) the ambient outside of the earbud housing.

In these occluded TWS earbuds, ANC is typically controlled according to two kinds of microphones (sound sensing devices, SSD): 1) Feedforward microphone (FFM) for sensing the sound outside of the earbud to provide signal about ambient sound in a feedforward signal path; and 2) Feedback microphone (FBM) for sensing sound inside the front-chamber plus ear-canal volume of space to provide signal regarding the results (i.e. the residuals of ambient noise in the front-chamber plus ear canal) of ANC in a feedback signal path.

In the above arrangement, by virtual of the said three subdivisions, the housing of occluded TWS earbud both isolates the FFM from the sound generated by earbud's own SPD and isolates the FBM from the ambient sound.

In other words, in occluded TWS earbuds, by creating the three subdivisions using the earbud housings, the FFM will be largely isolated from (or oblivious to) the sound generated by the earbuds, while the FBM will be largely isolated from (or oblivious to) ambient sound outside of the earbuds. These two "isolations" or "oblivions" state are critical foundations enabling powerful ANC features in the occluded TWS earbuds.

However, in OWS space is no longer subdivided to provide the isolations mentioned above (as TWS) and sound from SPD of OWS earbud will be detected by any microphone. As a result, FFM can no longer distinguish between ambient sound and sound produced by OWS' own SPD; and FBM can no longer monitor the result of ANC/AC without the disturbance of the ambient sound. It means, the foundations supporting the ANC/AC functionalities in the occluded TWS earbuds no longer exists in the new style OWS earbuds.

Therefore, how to provide an isolation between SPD and ambient sensing microphone for ANC or AC under OWS scenario is a significant objective in the field.

SUMMARY OF THE INVENTION

It is therefore a primary objective of the present application to provide an isolation between SPD and ambient sensing microphone, to improve over disadvantages of the prior art.

An embodiment of the present application provides a wearable device. The wearable device comprises a sound producing device and a sound sensing device. The sound producing device produces a front radiating wave and a back radiating wave while producing the sound. The sound sensing device is disposed on a nodal position where the front radiating wave and the back radiating wave cancel each other on the nodal position.

An embodiment of the present application provides a wearable device. The wearable device comprises a sound producing device, a sound sensing device and a signal processing circuit. The signal processing circuit receives a sensed signal produced by the sound sensing device. The signal processing circuit performs an operation on the sensed signal and produces a cleaned ambient signal. The operation is configured to mitigate a sound signal component corresponding to the sound produced by the sound producing device.

An embodiment of the present application provides a signal processing method applied in a signal processing circuit disposed within a wearable device. The signal processing method comprises receiving a sensed signal from a sound sensing device disposed within the wearable device; and performing an operation on the sensed signal, to mitigate a sound signal component corresponding to a sound produced by a sound producing device disposed within the wearable device, and producing a cleaned ambient signal; wherein the wearable device produces the sound toward an open field when a user wears the wearable device.

These and other objectives of the present invention will no doubt become obvious to those of ordinary skill in the art after reading the following detailed description of the preferred embodiment that is illustrated in the various figures and drawings.

DETAILED DESCRIPTION

In order to provide ANC (active noise cancellation) or AC (ambient control), an ASM (ambient sensing microphone) is necessary to obtain an ambient sound. In the present application, AC generally refers to technology which is to control/manage ambient sound to be perceived by listener/user.

An objective of the present application is to establish an isolation between SPD (sound producing device) and ASM (ambient sensing microphone, which is a kind of sound sensing device), such that an ANC/AC module may obtain a cleaned ambient sound free from sound/signal component corresponding to the sound produced by the SPD, or the sound/signal component corresponding to the sound produced by the SPD within the cleaned ambient sound is mitigated or minimized as much as possible.

In the present application, the isolation between SPD and ASM can be established via acoustic means and/or electric means. For acoustic means, ASM is suggested to be disposed on a nodal position at which front radiating wave and back radiating wave of the SPD cancel each other.

For electric means, a signal processing operation is performed on a sensed sound/signal from ASM so that the sound/signal component corresponding to the sound produced by the SPD is mitigated/minimized and the cleaned ambient sound/signal can be obtained. Preferably, both acoustic and electric means can be applied, but not limited thereto.

Figure 1:
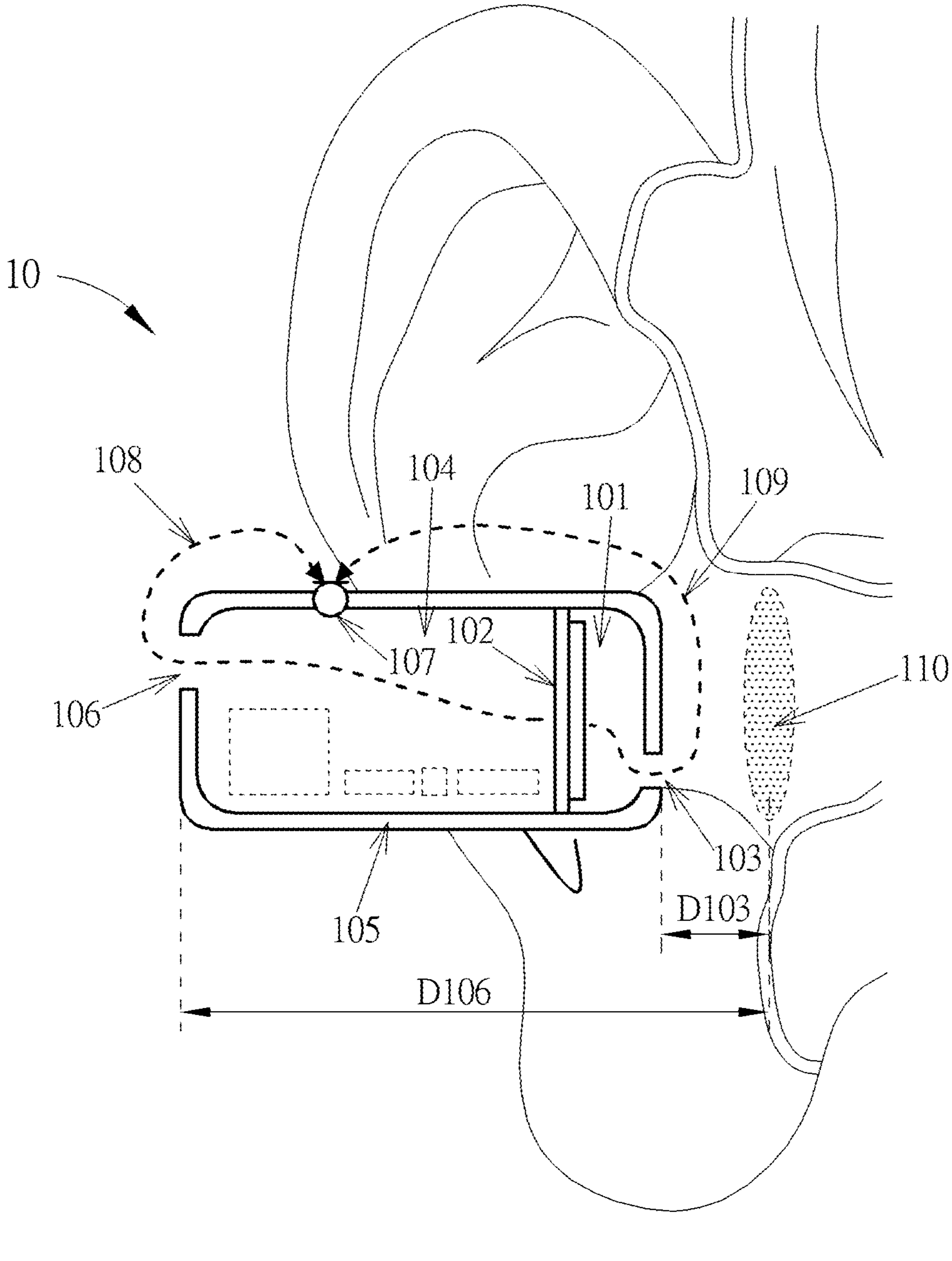
FIG. 1 is a schematic diagram of a wearable device according to an embodiment of the present application.

FIG. 1 is a schematic diagram of a wearable device 10 according to an embodiment of the present invention. The wearable device 10 comprises a housing 105, a sound producing device (SPD) 102 and a sound sensing device (SSD) 107, where the SSD 107 functions as an ASM to capture ambient sound. The SPD 102 may partition space within the wearable device 10 into a front chamber 101 and a back chamber 104. A front port 103 and a back port 106 are formed on the housing 105. The back chamber 104 may house the device's electronics, battery and wirings. The wearable device 10 may be an open wear style or open wearable stereo (OWS) earbud. It means the wearable device 10 is designed in away such that when a user wears the wearable device 10 the wearable device 10 produces sound toward a rather open or an open field, instead of an occluded ear canal. The SPD 102 produces a front radiating wave through the front port 103 via a front channel 109 and a back radiating wave through the back port 106 via a back channel 108 while producing the sound. Note that, front and back radiating waves usually have similar or same amplitude but opposite polarities.

In the present application, the wearable device producing sound toward open field generally can be interpreted that, on a sound propagation pathway the sound outlet (e.g., the port 103/106 shown in FIG. 1) is a distance (e.g., D103/D106) away from an ear orifice 110 of an ear canal, when user wears the wearable device. It means that sound radiates from the sound outlet, the sound would propagate through an open or rather open space, and then reaches the ear orifice (e.g., 110). Herein, "rather open" refers to "not occluded". In other words, the wearable device producing sound toward open field generally can also be interpreted that, acoustic radiation pathways/channels between the sound outlet and the ear orifice 110 are not occluded/enclosed. In this case, front/back radiating wave produced by the SPD would be (significantly) captured by the SSD/ASM of the wearable device.

To alleviate/bypass the problem of ambient sound captured by ASM being polluted by sound produced by SPD, the SSD 107 (functioning as ASM) may be disposed on a nodal plane or nodal position, where the front radiating wave and the back radiating wave may cancel each other or destructively interfere with.

Figure 2:
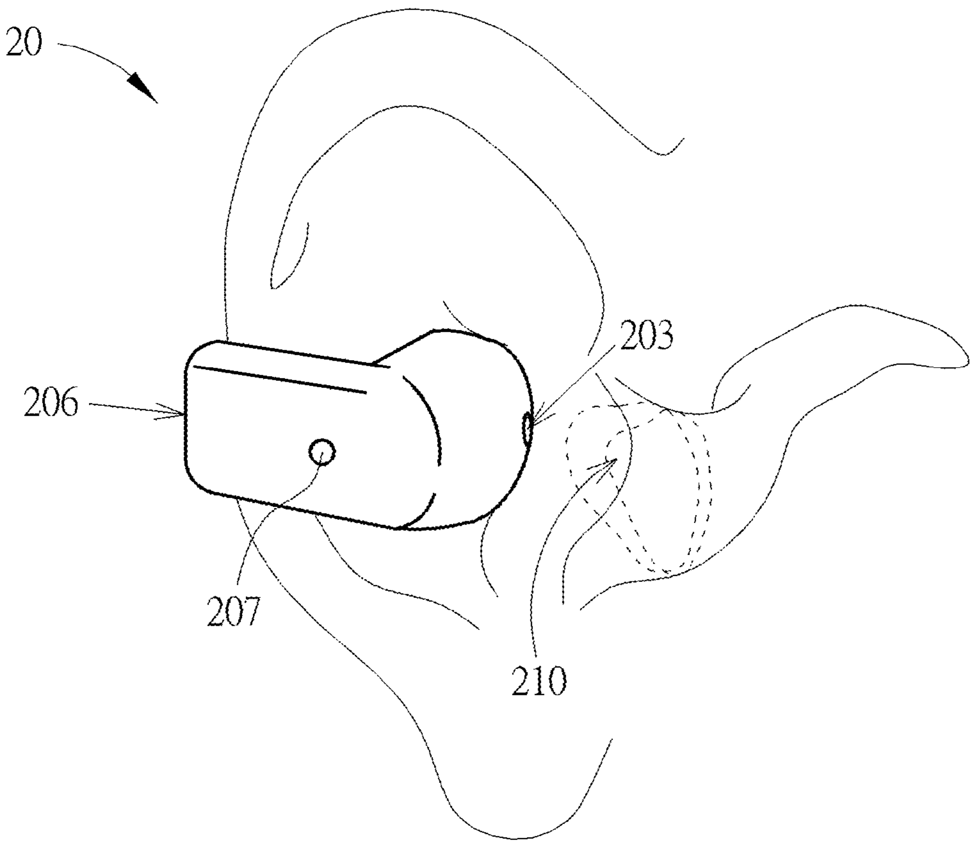
FIG. 2 is a schematic diagram of a wearable device according to an embodiment of the present application.

Illustratively, FIG. 2 illustrates a diagram of a commercial OWS wearable device 20 mounted on an ear with a front port 203 and a back port 206, where 210 denotes an ear orifice. By using simulation tools such as COMSOL, FIG. 3 illustrates a distribution of acoustic energy of front and back radiating waves (at 1.5 KHz as an example) over space around the wearable device 20, based on certain front/back port location.

Figure 3:
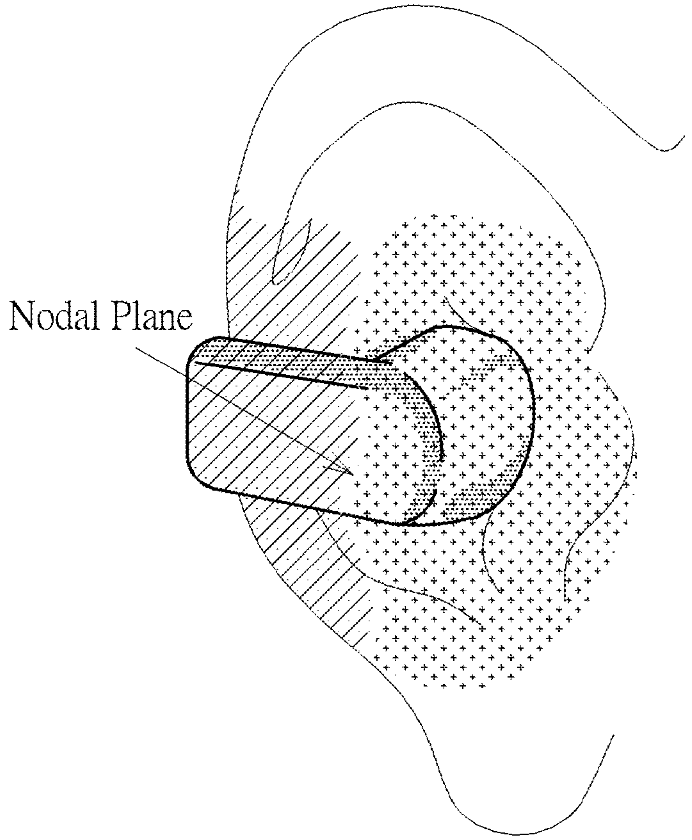
FIG. 3 illustrates a distribution of acoustic energy of front and back radiating waves over space around the wearable device shown in FIG. 2.

Darkness/brightness in FIG. 3 indicates strength of the acoustic energy. The darker the area, the stronger the acoustic energy thereover, regardless the polarity thereof. The right half portion of FIG. 3 is dominated by the front radiating wave and the left half portion of FIG. 3 is dominated by the back radiating wave. As can be seen from FIG. 3, a bright belt between the right and left portions in FIG. 3 indicates the nodal plane, where no/rare acoustic energy remains on the nodal plane. It is because that the front radiating wave and back radiating wave cancel each other on the nodal plane, a collection of nodal positions.

From the illustration above, it can be deducted that, when the nodal plane is formed ideally (which means it does not move with frequency) and ASM/SSD is located precisely on this plane, then sound waves from SPD will produce 0 (none) or near-0 (barely) output on ASM/SSD, i.e. sound from SPD becomes “invisible/oblivious to” or “isolated from” ASM/SSD. In other words, an isolation between SPD and ASM will be reestablished in OWS scenario, as the SPD-FFM isolation built by TWS housing.

Therefore, one aspect of this invention is the design of housing of the wearable device, including front chamber, front port, back chamber, back port, placements of SPD, electronics, battery and wiring within back chamber and, most importantly, the placement of ASM, which is tuned to produce as closely matched front channel and back channel frequency responses, in both amplitude and phase, across as broad a frequency band as possible. Herein, front/back channel refers to acoustic propagation pathway/channel from front/back side of SPD to ASM/SSD.

In other words, “placing ASM (e.g., 107/207) on a nodal plane/position between front-/back-radiations of SPD” may reestablish a foundation critical for ANC, ambient pass-through, etc., under the operating condition of OWS.

In an embodiment, SPD of the present application may be or comprise an air-pulse generating (APG) device disclosed in U.S. application Ser. No. 17/553,813, Ser. No. 18/321,759 or Ser. No. 18/829,245, but not limited thereto. It means, SPD of the present application may produce sound via producing a plurality of air pulses at an ultrasonic pulse rate.

Wearable devices 10 and 20 belong to 1-mic configuration (herein the term “mic” represents “microphone”, a kind of SSD), but not limited thereto. Wearable device having the isolation between SPD and ASM may have 2-mic configuration.

Figure 4:
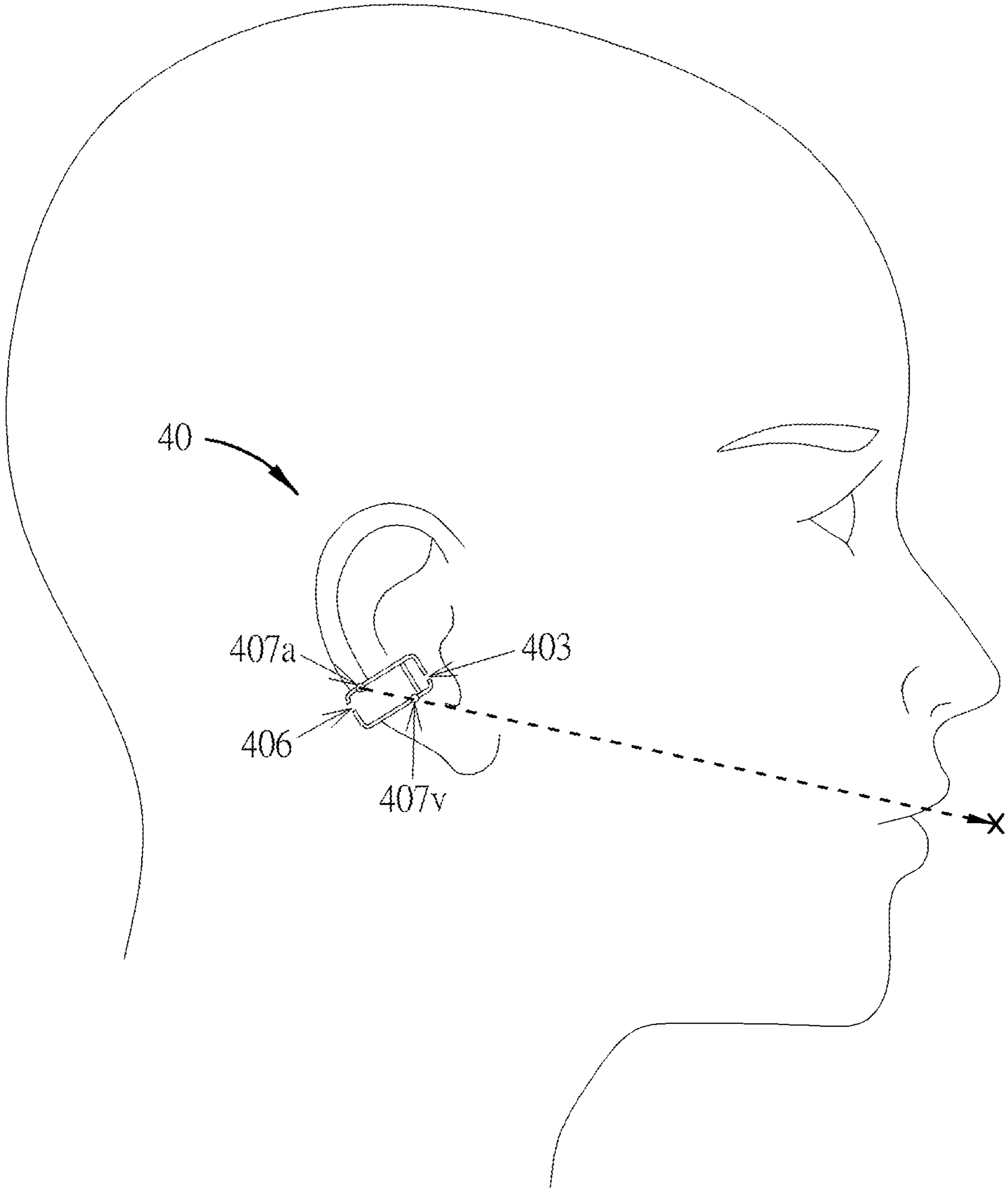
FIG. 4 is a schematic diagram of a wearable device according to an embodiment of the present application.

For example, FIG. 4 is a schematic/conceptual diagram of a wearable device 40 according to an embodiment of the present invention. In addition to (front/back) port 403/406, the wearable device 40 comprises a first (ambient) mic 407*a* and a second (voice) mic 407*v*. The first (ambient) mic 407*a* is configured to capture ambient sound and the second (voice) mic 407*v* is configured to capture user voice.

Figure 5:
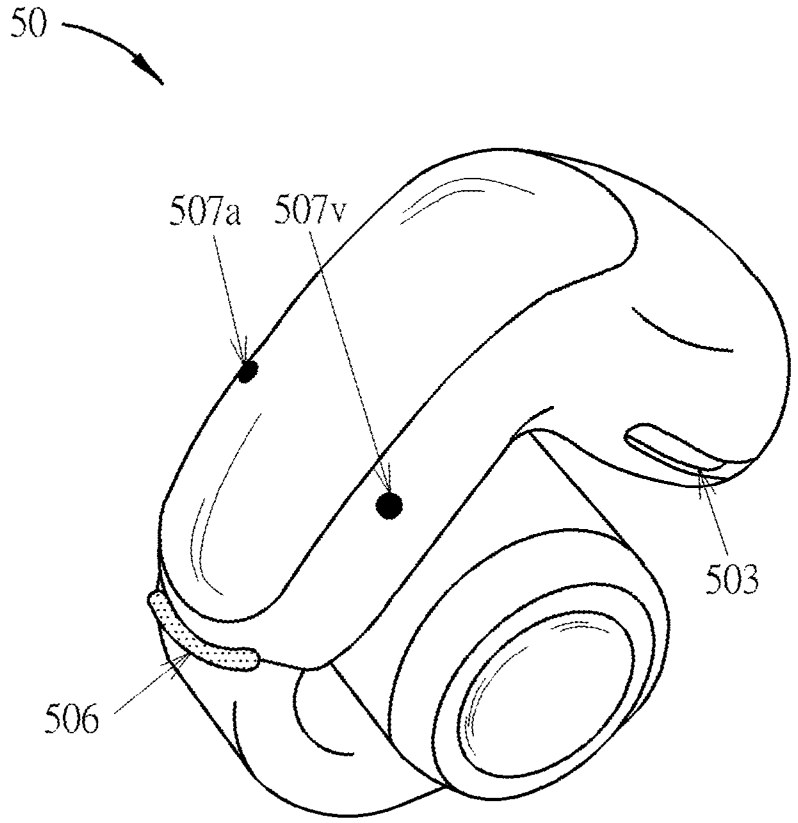
FIG. 5 is a schematic diagram of a wearable device according to an embodiment of the present application.

Practically, FIG. 5 is a schematic diagram of a wearable device 50 according to an embodiment of the present invention. An appearance of the wearable device 50 (and also 20) borrows from a commercially available OWS for illustration purpose only. In addition to (front/back) port 503/506, the wearable device 50 comprises a first mic 507*a* and a second mic 507*v*.

Both microphones 507*a* and 507*v* may be placed according to the same principle for ASM 207 of the device 20, i.e., both microphones 507*a* and 507*v* may be placed on a nodal plane or on two distinct nodal positions. In addition, the second (voice) mic 507*v* may be placed closer to and/or pointing towards a mouth of the user; while the first (ambient) mic 507*a* may be placed farther away from the mouth of the user and/or pointing towards the ambient.

Given wearable device 50 has two microphones, wearable device 50 may incorporate an acoustic beamforming system to extract an ambient signal or a user voice signal, by properly combining signals captured/sensed by microphones 507*a* and 507*v*.

Figure 6:
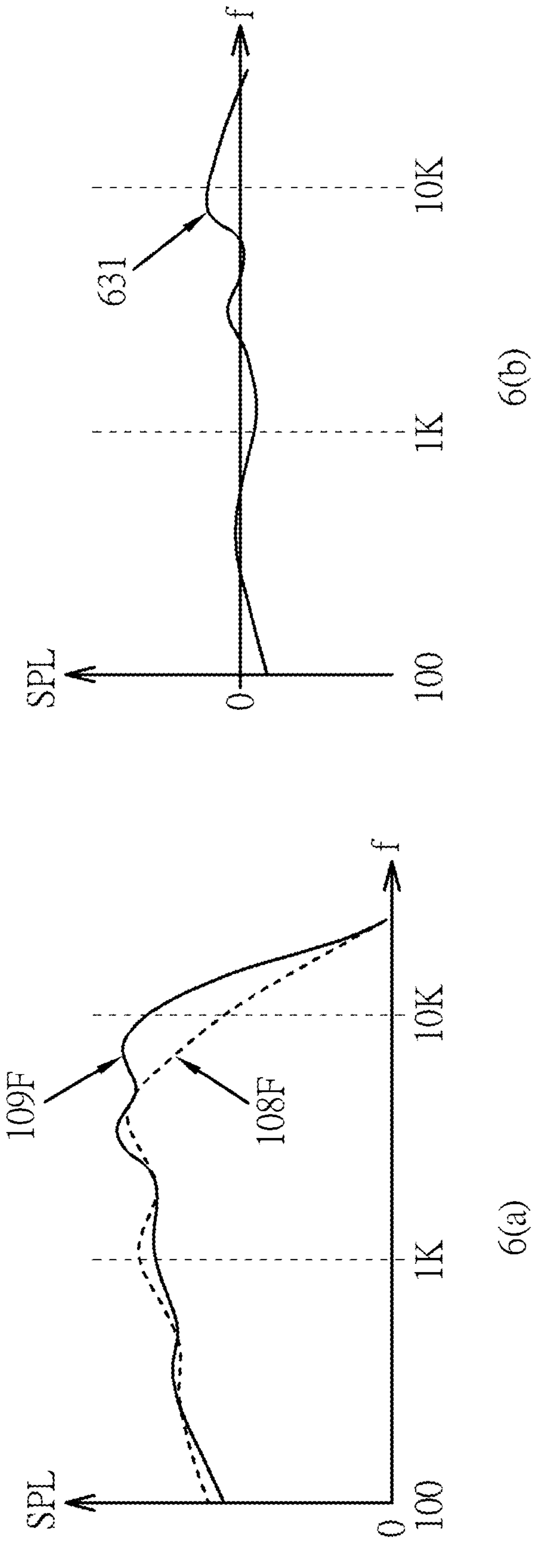
FIG. 6 illustrates amplitude response curves corresponding to the front and back radiating waves and discrepancy between the front and back radiating waves, in terms of SPL versus frequency.

Referring back to 1-mic configuration, note that, even though ASM is disposed on the nodal position/plane, discrepancy still exists between frequency response or transfer function of the front channel and the back channel (or between front radiating wave and back radiating wave). For example, FIG. 6(*a*) illustrates an amplitude response curve 109F corresponding to the front radiating wave and an amplitude response curve 108F corresponding to the back radiating wave, in terms of SPL (sound pressure level) versus frequency; and FIG. 6(*b*) illustrates an amplitude response curve 631 of discrepancy between the front and back radiating waves. Such discrepancy would degrade the isolation between SPD and ASM, causing stronger SPL leakage from SPD to ASM.

To redeem such discrepancy or SPL leakage problem, the wearable device of the present invention may comprise a signal processing circuit to remove such unwanted discrepancy.

Figure 7:
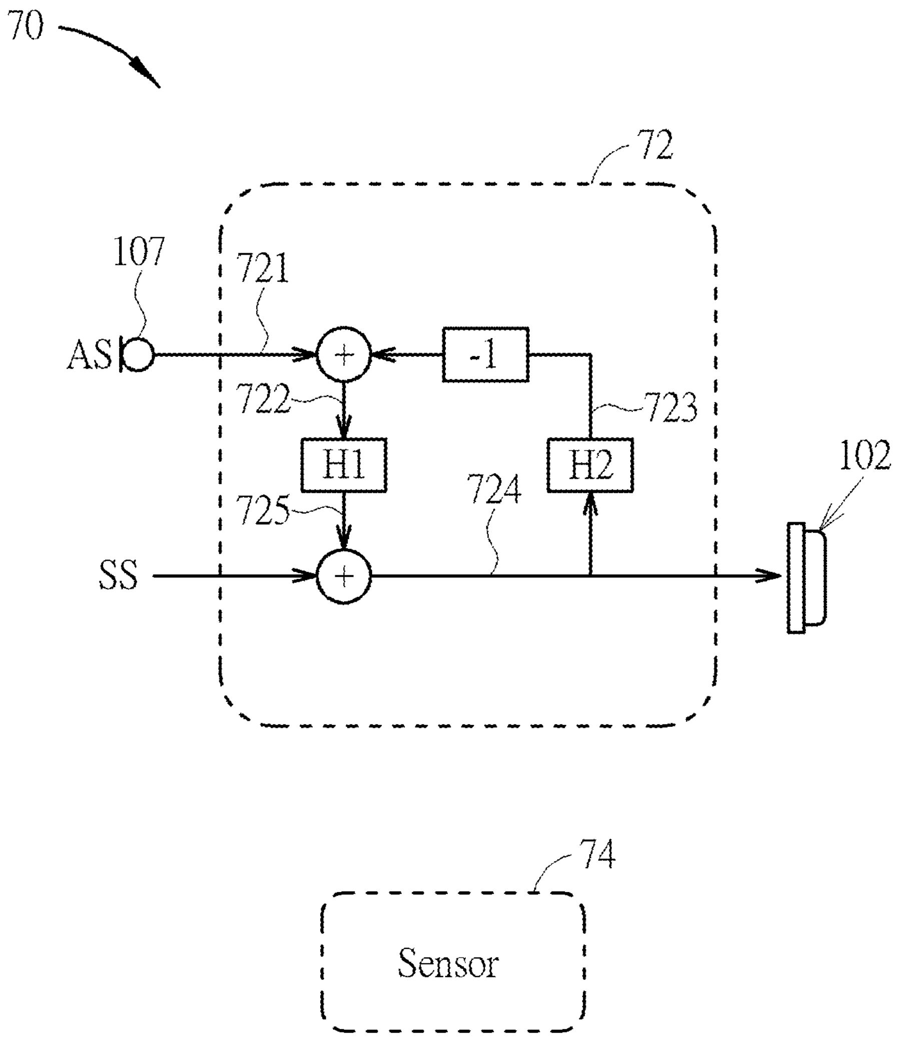
FIG. 7 illustrates a schematic diagram of a signal processing circuit according to an embodiment of the present invention.

FIG. 7 illustrates a schematic diagram of a signal processing circuit 72 according to an embodiment of the present invention. The signal processing circuit 72 is disposed within a wearable device 70. The wearable device 70 is similar to the wearable device 10, and thus same components are denoted by the same notations. The wearable device 70 is coupled to the ASM/SSD 107 and the SPD 102. The signal processing circuit 72 comprises a discrepancy/residual estimator H2.

The discrepancy estimator H2 is configured to estimate a discrepancy between the front radiating wave and the back radiating wave produced by the SPD 102 and generate a discrepancy estimate 723. The discrepancy estimator H2 may correspond to a difference between a first/front transfer function (e.g., with amplitude response 109F) of the front channel (e.g., channel 109) and a second/back transfer function (e.g., with amplitude response 108F) of the back channel (e.g., channel 108). The discrepancy estimator H2 generates the discrepancy estimate 723 according to the difference between the front and back transfer functions and also according to a driving signal 724 for the SPD 102.

Note that, the discrepancy estimate 723 may be considered as an SPL leakage from SPD 102 to ASM 107. Hence, the signal processing circuit 720 may subtract/remove the discrepancy estimate 723 from a sensed signal 721 from the ASM/SSD 107 to produce a cleaned ambient signal 722. That is, the signal component corresponding to the sound produced by the SPD 102 (e.g., 723) shall be removed from the sensed signal 721 from the ASM/SSD 107. Therefore, an anti-ambient block H1, similar to ANC operation, may produce an anti-ambient signal 725 according to the cleaned ambient signal 722.

The driving signal 724 may comprise the anti-ambient signal 725 and the SPD 102 may produce an anti-ambient sound to counter against an ambient sound AS (as much as possible). Hence, the listener may perceive more clear music or voice from an intended sound source/signal SS, without or less being disturbed by ambient.

Figure 8:
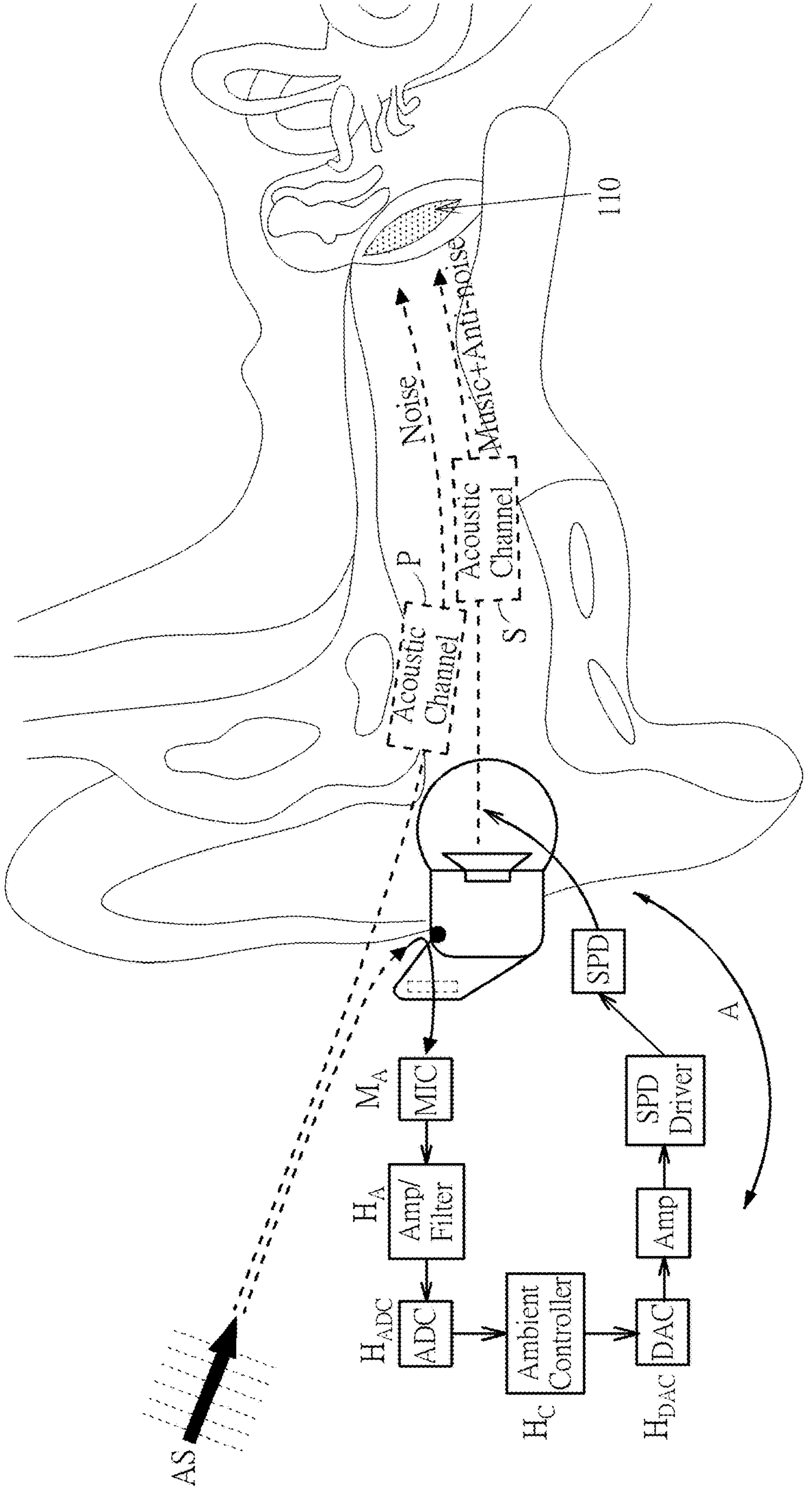
FIG. 8 illustrates a schematic diagram of a signal processing chain according to an embodiment of the present invention.

To visualize ambient sound (may be known as ambient noise) and a process of generating anti-ambient sound (may be known as anti-noise) propagation, FIG. 8 as an embodiment illustrates a diagram showing how ambient sound propagates and how anti-ambient sound is generated. Same notations are inherited from previous figures.

In FIG. 8, since source of ambient sound AS is assumed to be distance away from the wearable device (e.g., OWS earbud shown in FIG. 8), ambient sound AS is assumed/shown to be in planar wave.

As shown, the ambient sound AS may propagate through a (primary) acoustic channel P to a neighborhood of eardrum 810. In another way, the ambient sound AS may be received by microphone, and be processed by amplifier/filter, ADC (analog-to-digital converter), an ambient controller (as a part of signal processing circuit), DAC (digital-to-analog converter), amplifier Amp, SPD driver and SPD, such that an anti-ambient sound or anti-noise is generated. The anti-ambient sound or anti-noise may pass through a (secondary) acoustic channel S to reach the neighborhood of eardrum 810. Ideally, the noise (from ambient) and the anti-noise (from SPD) cancel each other, and the listener may enjoy the music without being interfered by the ambient noise/sound.

Figure 9:
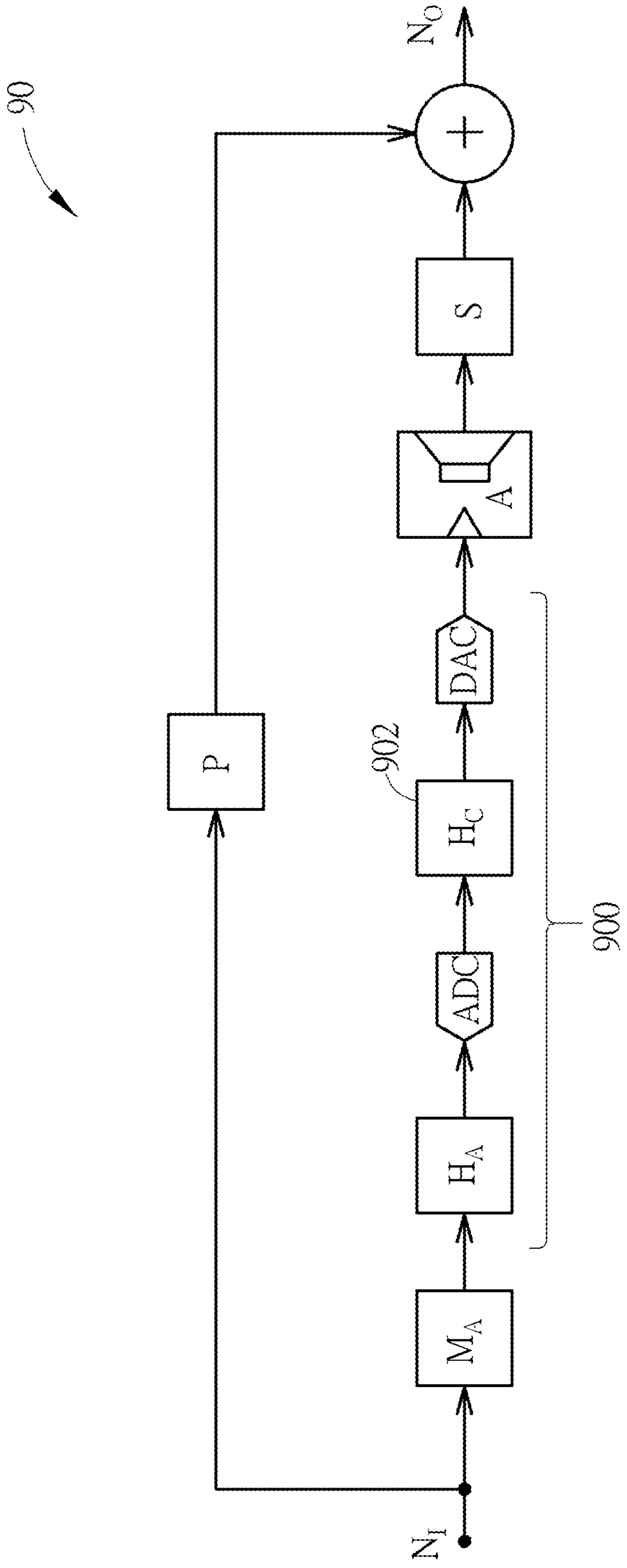
FIG. 9 illustrates a schematic diagram of a signal processing circuit according to an embodiment of the present invention.

FIG. 9 provides a system 90 as analytic block diagram showing signal processing chain in FIG. 8, where $M_A$ represents transfer function of microphone/ASM/SSD, $H_A$ represents aggregated transfer function of front-end amplifier/filter, $H_C$ represents transfer function of an ambient controller 902, A represents aggregated transfer function of output amplifier, SPD driver, SPD, and P/S represents transfer function of primary/secondary acoustic channel. Ideally, the ambient controller 902 may have transfer function $H_C$ such that $N_O=[P+S\cdot A\cdot H_C\cdot H_0\cdot M_A]N_I\rightarrow 0$ (eq. 1). In eq. 1, $N_1$ mathematically denotes input noise of the system 90 which is ambient noise AS. $N_O$ mathematically denotes output noise of the system 90 which is (residual) noise in ear canal or in the neighborhood of eardrum 810, after ambient and anti-ambient noise cancellation. In the current analysis, transfer functions of ADC and DAC are assumed to be aggregated for simplicity, and $H_0=H_A\,H_{ADC}\,H_{DAC}$ may be an aggregated transfer function taking front-end amplifier, ADC and DAC into consideration. Ideally, transfer function $H_C$ of ambient controller can be chosen such that $H_C=-[P/(S\cdot A\cdot H_0\cdot M_A)]$ (eq. 2).

Note that, rectangular blocks shown in FIG. 8 represent acoustic transducers and electric circuits embedded within the wearable device, and the electric circuits shown in FIG. 8 may comprise or be considered as signal processing circuit. In an embodiment, the wearable device of the present invention may comprise a signal processing circuit 900 shown in FIG. 9, wherein the signal processing circuit 900 may comprise front-end amplifier $H_A$, ADC, DAC, and importantly, the ambient controller 902.

In the present application, functional block and its transfer function sometimes share the same notation, which means, notation of transfer function sometimes (not always) is used to denote the corresponding functional block.

Figure 10:
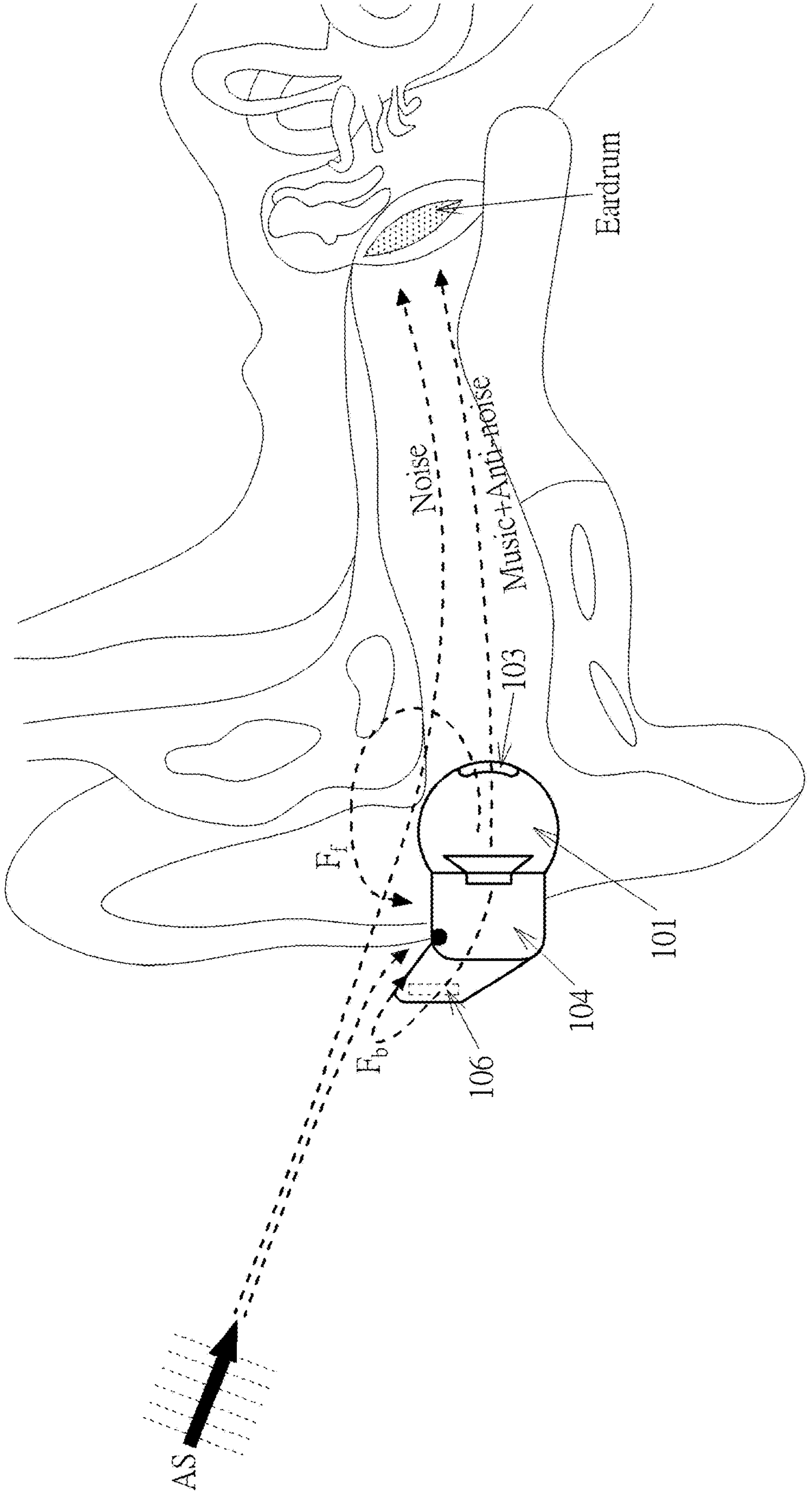
FIG. 10 is a schematic diagram of a wearable device according to an embodiment of the present application.

Note that, acoustic feedback path/channel from SPD to ASM/SSD is omitted in FIGS. 8 and 9 for simplicity. For completeness, as shown in FIG. 10 and FIG. 11, in addition to FIGS. 8 and 9, front channel $F_f$ from front side of SPD to ASM/SSD and back channel $F_b$ from back side of SPD to ASM/SSD are incorporated in FIG. 10 and FIG. 11(*a*).

Figure 11:
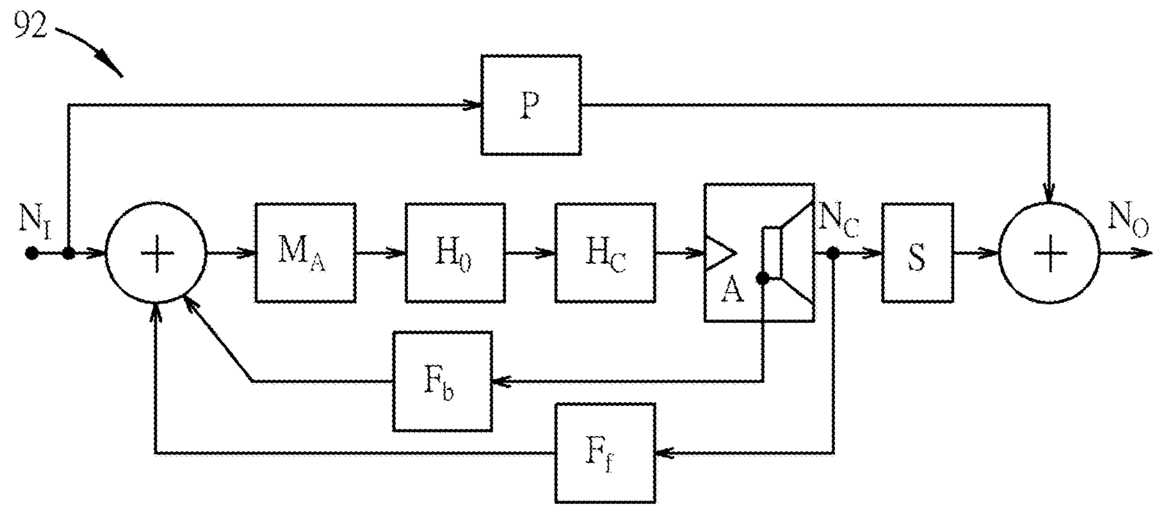
FIG. 11 illustrates a schematic diagram of a system according to an embodiment of the present invention.
Figure 11:
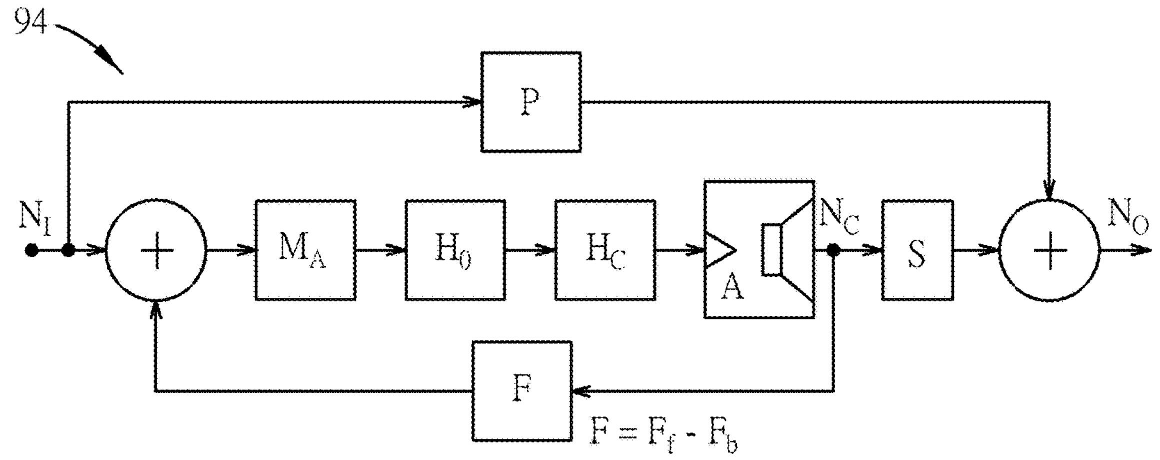
Figure 11:
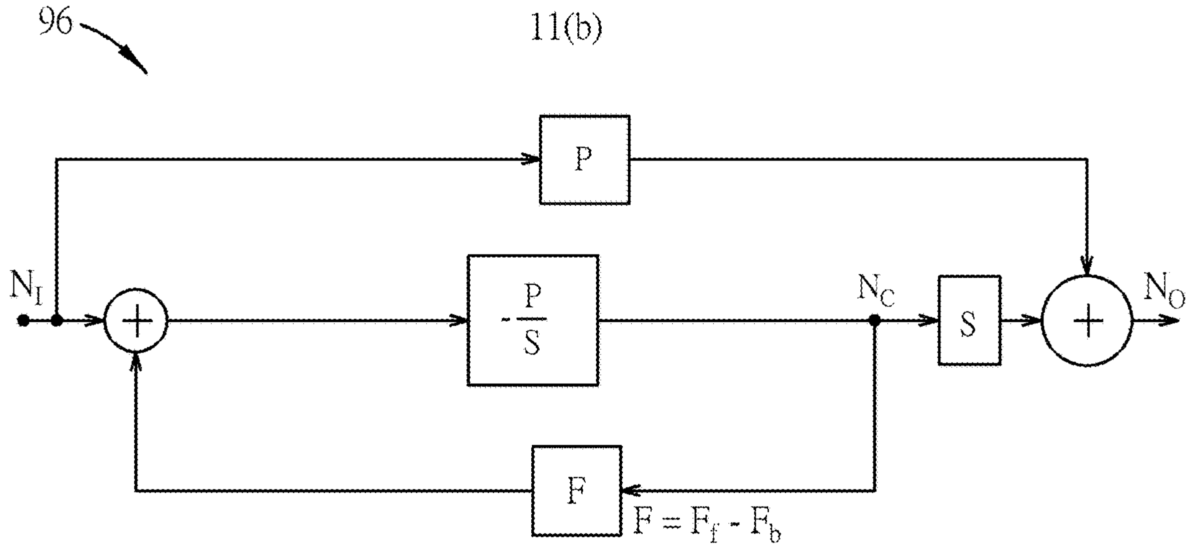

Suppose front and back radiating waves (radiated from SPD) have substantially equal amplitude and opposite polarity, system 92 shown in FIG. 11(*a*) may be derived as system 94 shown in FIG. 11(*b*), wherein feedback path F may be expressed as $F=F_f-F_b$, a difference of transfer functions corresponding to the front and back channels.

Suppose the transfer function of the controller can be found as eq. 2, and system 94 shown in FIG. 11(*b*) may be derived as system 96 shown in FIG. 11(*c*). In this case, noises $N_I$, $N_C$ and $N_O$ in FIG. 11 can be expressed as $$N_C=-\frac{\frac{P}{S}}{1+F\frac{P}{S}}\cdot N_I \quad \text{(eq. 3)}$$

and

-continued $$N_O=\left[1-\frac{1}{1+F\frac{P}{S}}\right]PN_I. \quad \text{(eq. 4)}$$

Note that, the acoustic means for isolating ASM from SPD (disposing the ASM on the nodal position) is to achieve $F\rightarrow 0$ (mathematically), and therefore $N_O\rightarrow 0$ from eq. 4, ideally.

Practically, $F\rightarrow 0$ might not be perfectly realizable. When $F\neq 0$, which means significant mismatch/discrepancy between (the transfer functions of) the front and back channels, a feedback path/block may further be included in the ambient controller.

Figure 12:
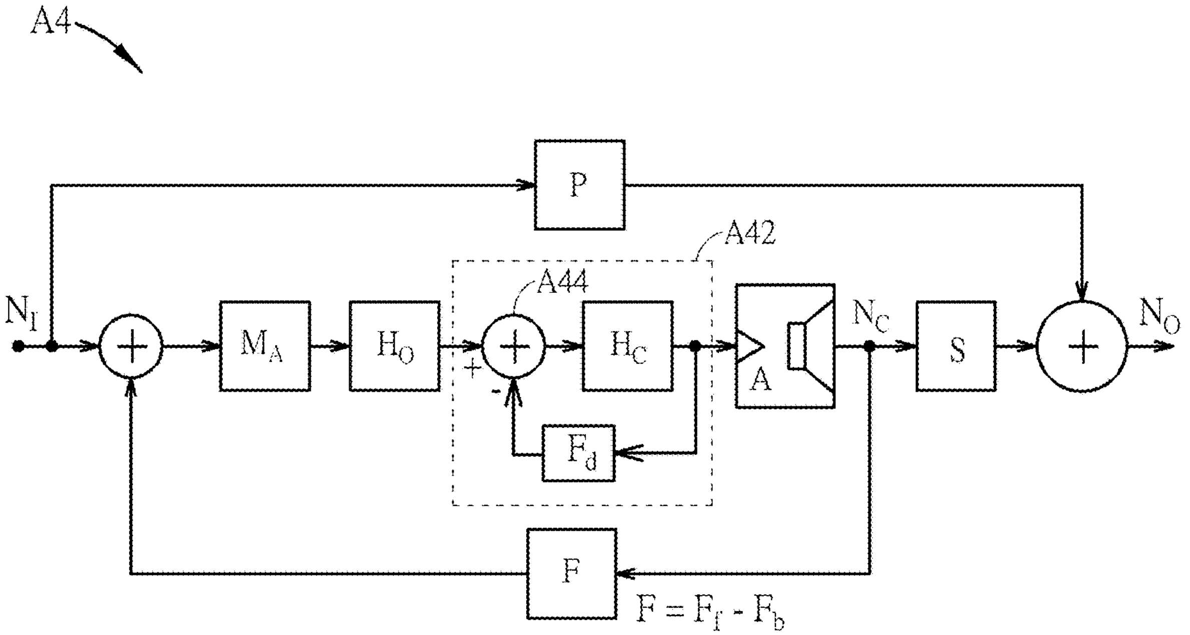
FIG. 12 illustrates a schematic diagram of a system according to an embodiment of the present invention.
Figure 12:
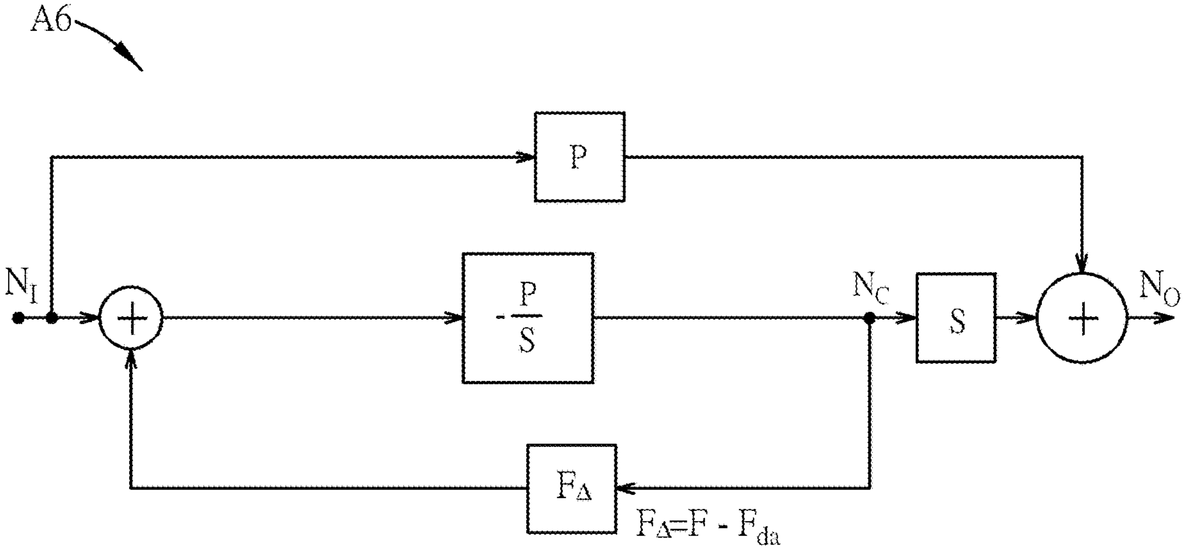

For example, FIG. 12(*a*) illustrates an ambient controller A42 comprising a feedback loop with a forward block with transfer function $H_C$ and a feedback block with transfer function $F_d$. Transfer function $H_C$ may be found via eq. 2. Transfer function $F_d$ is chosen such that $F_\Delta\rightarrow 0$, where system A4 shown in FIG. 12(*a*) is equivalent to system A6 shown in FIG. 12(*b*) with feedback path $F_\Delta=F-F_{da}$, and $F_{da}$ is related to $F_d$. In other words, it is possible to choose the feedback block with transfer function $F_d$ such that $F_\Delta\rightarrow 0$. In an embodiment, $F_d$ may be chosen as $F_d=(A\cdot H_0\cdot M_A)\cdot F_{da}$ or $F_d=(A\cdot H_0\cdot M_A)\cdot F$.

If $F_\Delta\rightarrow 0$ is desirable for $F\neq 0$, then $F_d$ may be designed such that $F_{da}\rightarrow F$, where $F=F_f-F_b$. It means the feedback block with transfer function $F_d$ shall be related to the difference between transfer function $F_f$ and transfer function $F_b$.

Note that, FIG. 12(*a*) demonstrates concept similar to which shown in FIG. 7. The forward block $H_C$ within the ambient controller A42 shown in FIG. 12(*a*) may be analogous to the anti-ambient block H1 shown in FIG. 7. The feedback block $F_d$ shown in FIG. 12(*a*) may be analogous to the discrepancy estimator H2 shown in FIG. 7. Output of the feedback block $F_d$ in FIG. 12(*a*) may be analogous to discrepancy estimate 723 in FIG. 7. Subtractor A44 included in ambient controller A42 in FIG. 12(*a*) subtracts an output from the feedback block $F_d$ from a sensed signal from the sound sensing device $M_A$ may be analogous to the subtraction operation performed by the signal processing circuit 72. The signal 722 is analogous to an output from the subtractor A44.

No matter whether the feedback block $F_d$ in FIG. 12(*a*) or the discrepancy estimator H2 in FIG. 7, it is crucial to obtain (information of) the difference of transfer functions corresponding to the front and back channels, e.g., $F=F_f-F_b$.

In a short remark, the signal processing circuit of present invention may obtain difference of transfer functions corresponding to the front and back channels, and mitigate the sound signal component corresponding to the sound produced by the SPD, e.g., by subtracting/removing discrepancy estimate 723 (or analogously/equivalently output of feedback block $F_d$ in the ambient controller A42) from the sensed signal 721.

In addition, since the front and back channels depend not only on the design of housing but also on hair style, earrings, glasses worn that day and how the earbud was mounted at the moment. Lots of variations may occur, so recalibration may be desirable to maintain optimal ambient control performance.

One embodiment may involve using a calibration test signal/tone (such as a series of log frequency sweeps, of various durations and amplitudes) to refine the (factory) curve of discrepancy response 631. Such recalibration process may be engaged automatically every time device is detected to be "mounted on the ear" (such as by a proximity sensor) or engaged manually by user indication (via touch, voice or APP control).

In other words, for recalibration, the signal processing circuit may be controlled (e.g., by a controller) to obtain the difference transfer function. In addition, the wearable device may optionally comprise a sensor (e.g., a sensor 74 within the wearable device 70), configured to detect whether the wearable device (e.g., 70) is mounted on the user. In an embodiment, the sensor 74 may be a proximity sensor.

Referring back to 2-mic configuration, instead of removing residual, an equalizing operation may be performed on the sensed signals, to mitigate the sound signal component from the sensed signals and to produce a cleaned ambient signal.

Figure 13:
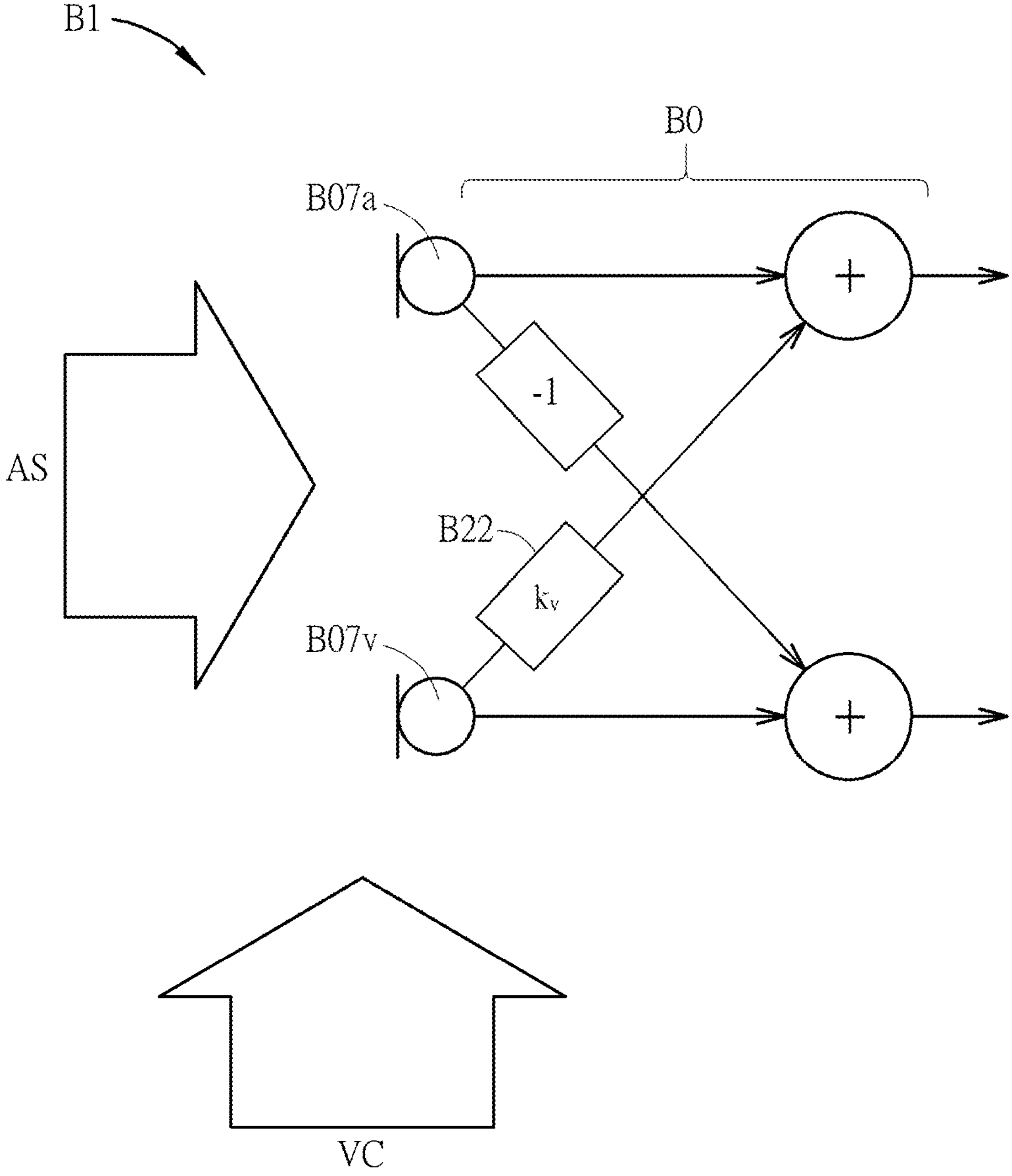
FIG. 13 is a schematic diagram of a wearable device comprising a signal processing circuit according to an embodiment of the present application.

For example, FIG. 13 illustrates a schematic diagram of a wearable device B1 comprising a signal processing circuit B0 according to an embodiment of the present invention. The signal processing circuit B0 is coupled to an ambient/first mic B07*a* and a voice/second mic B07*v*, to receive a first and second sensed signals from microphones B07*a* and B07*v*. The signal processing circuit B0 comprises a block B22 mathematically expressed as $k_v$. The block B22 is designed to fulfill $Amic+k_v \cdot Vmic=0$ or to minimize $\|Amic+k_v \cdot Vmic\|$ as much as possible, where $\|\cdot\|$ may represent or correspond to an energy or a norm of input argument. In an interpretation, Amic and Vmic can be interpreted as sensed signal sensed by ambient mic and voice mic, respectively. In another interpretation, Amic and Vmic may represent transfer function from SPD to the ambient mic and to voice mic, respectively.

In an embodiment, $k_v$ may be found to be $k_v=-Vmic/Amic$ (eq. 5)(herein slash symbol "/" refers to "division"), and transfer functions Vmic/Amic may be found by "system identification" tool via simulation software such as MATLAB (herein slash symbol "/" means "or"). In an embodiment, $k_v$ may be optimized over a frequency band of interest, e.g., 20 to 8K Hz, which is not limited thereto.

Note that, in the embodiment shown in FIG. 13, the block B22 or $k_v$ is applied on Vmic. The block B22 or $k_v$ may also be applied on Amic, which is not limited thereto.

In an embodiment, the signal processing circuit B0 may perform a subtraction operation on the sensed signals, e.g., perform Vmic−Amic, to capture a voice signal. Rationale behind the capturing voice by subtraction could be: 1) ambient sound AS, being generally far field, tend to produce nearly identical output from B07*a* and B07*v*, and therefore such signals tend to largely cancelling each other out by the subtraction; 2) the voice VC uttered by user is near field, i.e. the intensity$\propto$1/r, suppose B07*v* is closer to and points towards the mouth of the user while B07*a* is farther from and points away from the mouth of the user, this SPL$\propto$1/r cause B07*v* to generate higher output in response to VC than B07*a*, and the subtraction will leave behind a significant portion corresponding to voice VC.

Referring back to eq. 5 or the block B22 with transfer function $k_v$, it might be beneficial to obtain the ratio of transfer function between the transfer function Vmic and the transfer function Amic, and the equalizing operation is performed according to the ratio Vmic/Amic.

In other words, in the 2-mic configuration, the signal processing circuit of present invention may obtain a ratio of transfer function, e.g., Vmic/Amic, perform the equalizing operation (e.g., by block B22 with transfer function $k_v$) on one sensed signal according to the ratio of transfer function, and combine the equalized signal (e.g., output of the block B22) and the other sensed signal, to mitigate the sound signal component.

In an embodiment, the block B22, the ambient controller (including the forward block $H_C$ and the feedback block $F_d$), the discrepancy estimator H2, and the anti-ambient block H1 may be realized by digital IIR (Infinite Impulse Response) filter, but not limited thereto.

The above discussion will also be applicable to ambient control for smart glasses, where the same SPD-to-mic isolation problem exists. Smart glasses in the present application owns functions additional to plain optical functionalities. For example, smart glasses may have electronic devices embedded therein to perform audio/video related operation (s).

Figure 14:
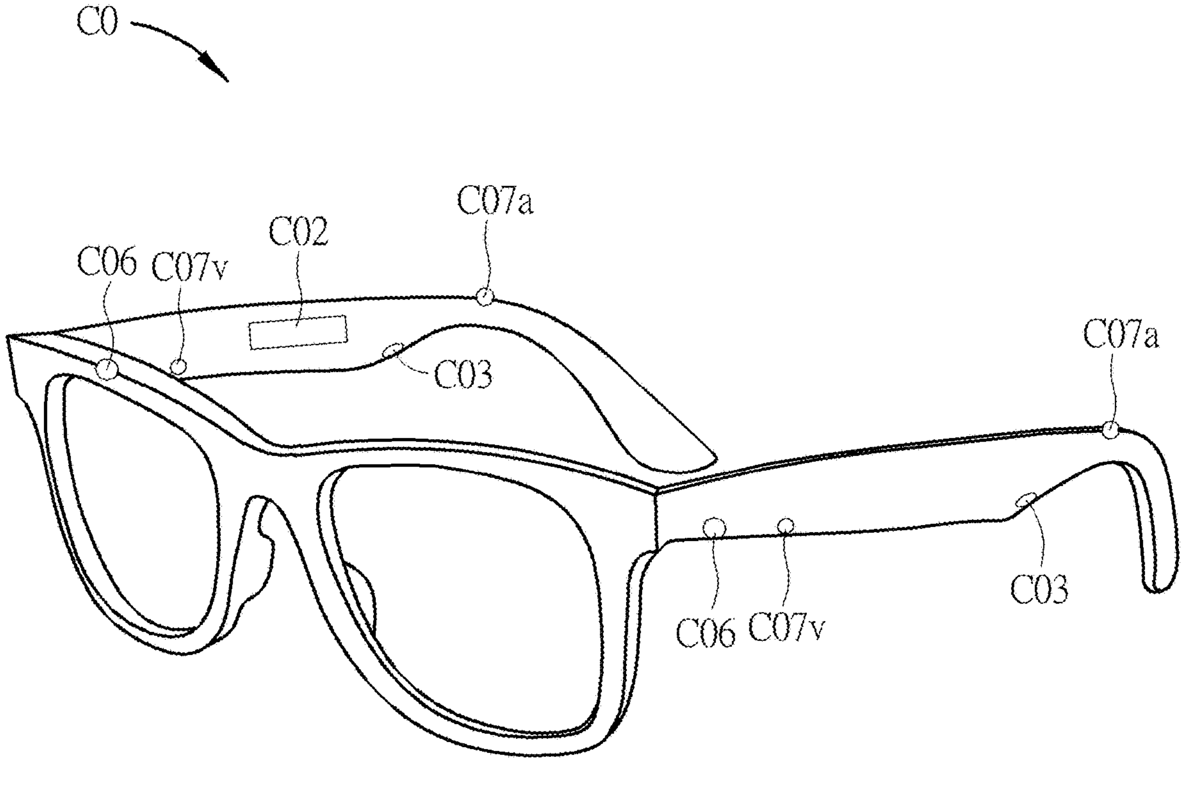
FIG. 14 is a schematic diagram of a wearable device according to an embodiment of the present application.

For example, FIG. 14 illustrates a schematic diagram of a wearable device CO according to an embodiment of the present invention. The wearable device CO may comprise SPD C02, ports C03, C06 and microphones C07*a*, C07*v*. In the embodiment shown in FIG. 14, the port C03 may function as front port and is typically located at a location with the shortest distance to the opening of ear canal; the port C06 may function as back port, and be located near the hinges/mounts of the legs, to maximize the low frequency (e.g., <100 Hz) frequency response; the mic C07*v* (for capturing user voice) may be 14 way from back port C06 to front port C03; mic C07*a* (for capturing user ambient sound) may be above port C03 and/or near the end of the straight port of the leg, which is not limited thereto.

In an embodiment, the microphones C07*a*, C07*v* may be disposed on nodal positions.

In an embodiment, the wearable device CO may comprise the signal processing circuit discussed above to mitigate sound signal component corresponding to the sound produced by the SPD from sensed signal sensed by microphones.

In short, the present invention is to establish SPD-to-SSD or SPD-to-ASM isolation. Acoustic means disposing mic on nodal position and electric means mitigating sound signal component from sensed signal are provide to produces cleaned ambient signal free from component corresponding to sound produced by SPD.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wearable device, comprising:

a sound producing device, a first sound sensing device, a second sound sensing device and a signal processing circuit;

wherein the sound producing device produces a front radiating wave and a back radiating wave while producing a sound;

wherein the first sound sensing device is disposed on a first nodal position corresponding to the sound producing device, and the second sound sensing device is disposed on a second nodal position corresponding to the sound producing device;

wherein on the first and second nodal positions, the front radiating wave and the back radiating wave cancel each other;

wherein the signal processing circuit comprises a discrepancy estimator;

wherein the discrepancy estimator is configured to estimate a discrepancy between the front radiating wave and the back radiating wave produced by the sound producing device and generate a discrepancy estimate.

2. The wearable device of claim 1, comprising:

a first port and a second port;

wherein the front radiating wave propagates outward via the first port and the back radiating wave propagates outward via the second port.

3. The wearable device of claim 1, wherein the first sound sensing device is configured to receive a voice from a user;

wherein the second sound sensing device is configured to receive an ambient sound from an ambient.

4. The wearable device of claim 1, wherein the wearable device produces the sound toward an open field when a user wears the wearable device.

5. The wearable device of claim 1, wherein the wearable device is an earbud or a smart glass.

6. The wearable device of claim 1, wherein the sound producing device comprises an air pulse generating device;

wherein the sound producing device produces the sound by generating a plurality of air pulses at an ultrasonic pulse rate.

7. A wearable device, comprising:

a sound producing device, a sound sensing device and a signal processing circuit;

wherein the signal processing circuit receives a sensed signal produced by the sound sensing device;

wherein the signal processing circuit performs an operation on the sensed signal and produces a cleaned ambient signal;

wherein the operation is configured to mitigate a sound signal component corresponding to a sound produced by the sound producing device;

wherein the signal processing circuit comprises a discrepancy estimator;

wherein the discrepancy estimator is configured to estimate a discrepancy between a front radiating wave and a back radiating wave produced by the sound producing device and generate a discrepancy estimate.

8. The wearable device of claim 7, wherein the wearable device produces the sound toward an open field when a user wears the wearable device.

9. The wearable device of claim 7, wherein the signal processing circuit removes the sound signal component from the sensed signal and produces the cleaned ambient signal.

10. The wearable device of claim 7, wherein the signal processing circuit subtracts the discrepancy estimate from the sensed signal to produce the cleaned ambient signal.

11. The wearable device of claim 7, wherein the discrepancy estimator generates the discrepancy estimate according to a driving signal for the sound producing device.

12. The wearable device of claim 7, wherein the discrepancy estimator corresponds to a transfer function related to a difference between a first transfer function and a second transfer function;

wherein the first transfer function corresponds to a front channel from a front side of the sound producing device to the sound sensing device;

wherein the second transfer function corresponds to a back channel from a back side of the sound producing device to the sound sensing device.

13. The wearable device of claim 7, wherein the signal processing circuit comprises an anti-ambient block;

wherein the anti-ambient block produces an anti-ambient signal according to the cleaned ambient signal;

wherein a driving signal for the sound producing device comprises the anti-ambient signal.

14. The wearable device of claim 7, wherein the signal processing circuit comprises a digital IIR (Infinite Impulse Response) filter.

15. The wearable device of claim 7, wherein the sound producing device comprises an air pulse generating device;

wherein the sound producing device produces the sound by generating a plurality of air pulses at an ultrasonic pulse rate.

16. A wearable device, comprising:

a sound producing device, a sound sensing device and a signal processing circuit;

wherein the signal processing circuit receives a sensed signal produced by the sound sensing device;

wherein the signal processing circuit performs an operation on the sensed signal and produces a cleaned ambient signal;

wherein the operation is configured to mitigate a sound signal component corresponding to a sound produced by the sound producing device;

wherein the signal processing circuit comprises a feedback loop with a forward block and a feedback block;

wherein the feedback block has a transfer function related to a difference between a first transfer function and a second transfer function;

wherein the first transfer function corresponds to a front channel from a front side of the sound producing device to the sound sensing device;

wherein the second transfer function corresponds to a back channel from a back side of the sound producing device to the sound sensing device.

17. The wearable device of claim 16, wherein the signal processing circuit comprises a subtractor;

wherein the subtractor subtracts an output from the feedback block from a sensed signal from the sound sensing device.

18. A wearable device, comprising:

a sound producing device and a signal processing circuit;

a first sound sensing device, producing a first sensed signal; and a second sound sensing device, producing a second sensed signal;

wherein the signal processing circuit receives the first sensed signal and the second sensed signal;

wherein the signal processing circuit performs an equalizing operation on the first sensed signal and the second sensed signal, to mitigate a sound signal component and produce a cleaned ambient signal;

wherein the sound signal component corresponds to a sound produced by the sound producing device.

19. The wearable device of claim 18, wherein the signal processing circuit performs a subtraction operation on the first and second sensed signals, to capture a voice signal.

20. A wearable device, comprising:

a sound producing device, a sound sensing device and a signal processing circuit;

wherein the signal processing circuit receives a sensed signal produced by the sound sensing device;

wherein the signal processing circuit performs an operation on the sensed signal and produces a cleaned ambient signal;

wherein the operation is configured to mitigate a sound signal component corresponding to a sound produced by the sound producing device;

wherein the signal processing circuit obtains a difference transfer function between a first transfer function and a second transfer function;

wherein the first transfer function corresponds to a front channel from a front side of the sound producing device to the sound sensing device;

wherein the second transfer function corresponds to a back channel from a back side of the sound producing device to the sound sensing device.

21. The wearable device of claim 20, wherein the signal processing circuit is controlled to obtain the difference transfer function.

22. The wearable device of claim 21, comprising:

a sensor, configured to detect whether the wearable device is mounted on a user;

wherein the signal processing circuit obtains the difference transfer function when the sensor detects the wearable device is mounted.

23. A signal processing method applied in a signal processing circuit disposed within a wearable device, the signal processing method comprising:

receiving a sensed signal from a sound sensing device disposed within the wearable device; and performing an operation on the sensed signal, to mitigate a sound signal component corresponding to a sound produced by a sound producing device disposed within the wearable device, and producing a cleaned ambient signal;

wherein the wearable device produces the sound toward an open field when a user wears the wearable device;

wherein the step of performing the operation on the sensed signal to mitigate the sound signal component further comprises:

obtaining a difference transfer function between a first transfer function and a second transfer function;

obtaining a discrepancy estimate according to the difference transfer function and a driving signal for the sound producing device; and removing the discrepancy estimate from the sensed signal to produce the cleaned ambient signal;

wherein the first transfer function corresponds to a front channel from a front side of the sound producing device to the sound sensing device;

wherein the second transfer function corresponds to a back channel from a back side of the sound producing device to the sound sensing device.

24. A signal processing method applied in a signal processing circuit disposed within a wearable device, the signal processing method comprising:

receiving a sensed signal from a sound sensing device disposed within the wearable device; and performing an operation on the sensed signal, to mitigate a sound signal component corresponding to a sound produced by a sound producing device disposed within the wearable device, and producing a cleaned ambient signal;

wherein the wearable device produces the sound toward an open field when a user wears the wearable device;

wherein the step of performing the operation on the sensed signal to mitigate the sound signal component further comprises:

receiving a first sensed signal from a first sound sensing device and a second sensed signal from a second sound sensing device;

performing an equalizing operation on the first sensed signal and producing an equalized signal; and mitigating the sound signal component according to the equalized signal.

25. A signal processing method applied in a signal processing circuit disposed within a wearable device, the signal processing method comprising:

receiving a sensed signal from a sound sensing device disposed within the wearable device; and performing an operation on the sensed signal, to mitigate a sound signal component corresponding to a sound produced by a sound producing device disposed within the wearable device, and producing a cleaned ambient signal;

wherein the wearable device produces the sound toward an open field when a user wears the wearable device;

wherein the step of performing the operation on the sensed signal to mitigate the sound signal component further comprises:

obtaining a ratio of transfer function of a first transfer function and a second transfer function;

receiving a first sensed signal from a first sound sensing device and a second sensed signal from a second sound sensing device;

performing an equalizing operation on the first sensed signal according to the ratio of transfer function and producing an equalized signal; and combining the equalized signal and the second sensed signal, to mitigate the sound signal component;

wherein the first transfer function corresponds to a first channel from the sound producing device to the first sound sensing device;

wherein the second transfer function corresponds to a second channel from the sound producing device to the second sound sensing device.

* * * * *